US007506535B2

(12) United States Patent
Kang

(10) Patent No.: US 7,506,535 B2
(45) Date of Patent: Mar. 24, 2009

(54) METHOD AND APPARATUS FOR DETERMINING A COMBUSTION PARAMETER FOR AN INTERNAL COMBUSTION ENGINE

(75) Inventor: Jun-Mo Kang, Ann Arbor, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 107 days.

(21) Appl. No.: 11/739,185

(22) Filed: Apr. 24, 2007

(65) Prior Publication Data

US 2008/0264382 A1 Oct. 30, 2008

(51) Int. Cl.
*G01M 15/00* (2006.01)

(52) U.S. Cl. .................................................. 73/114.16

(58) Field of Classification Search ............. 73/114.16, 73/114.17, 114.26, 114.27, 114.28
See application file for complete search history.

(56) References Cited

U.S. PATENT DOCUMENTS

| | | | | |
|---|---|---|---|---|
| 4,691,682 | A | 9/1987 | Hoppie | |
| 5,359,883 | A * | 11/1994 | Baldwin et al. | 73/114.16 |
| 6,055,948 | A | 5/2000 | Shiraishi et al. | |
| 6,508,229 | B2 | 1/2003 | Miyakubo et al. | |
| 6,615,129 | B2 | 9/2003 | Kabasin | |
| 6,662,785 | B1 | 12/2003 | Sloane et al. | |
| 6,758,177 | B1 | 7/2004 | McKay et al. | |
| 6,968,827 | B2 | 11/2005 | Vermonet et al. | |
| 6,971,365 | B1 | 12/2005 | Najt et al. | |
| 6,994,072 | B2 | 2/2006 | Kuo et al. | |
| 7,059,281 | B2 | 6/2006 | Kuo et al. | |
| 7,063,068 | B2 | 6/2006 | Nakai et al. | |
| 7,077,084 | B2 | 7/2006 | Mallebrein | |
| 7,080,613 | B2 | 7/2006 | Kuo et al. | |
| 7,128,062 | B2 | 10/2006 | Kuo et al. | |
| 2001/0002587 | A1 * | 6/2001 | Walter et al. | 123/90.15 |
| 2003/0188571 | A1 * | 10/2003 | Wright | 73/115 |
| 2006/0116812 | A1 * | 6/2006 | Akazaki et al. | 701/114 |
| 2006/0144356 | A1 | 7/2006 | Sellnau et al. | |
| 2006/0196466 | A1 | 9/2006 | Kuo et al. | |
| 2006/0196467 | A1 | 9/2006 | Kang et al. | |
| 2006/0196468 | A1 | 9/2006 | Chang et al. | |
| 2006/0196469 | A1 | 9/2006 | Kuo et al. | |
| 2006/0236958 | A1 | 10/2006 | Sun et al. | |
| 2006/0243241 | A1 | 11/2006 | Kuo et al. | |
| 2007/0250256 | A1 * | 10/2007 | Kang et al. | 701/115 |

FOREIGN PATENT DOCUMENTS

| | | | |
|---|---|---|---|
| JP | 2000054889 | A | 2/2000 |
| JP | 2005240722 | A | 9/2005 |

* cited by examiner

*Primary Examiner*—Eric S McCall

(57) ABSTRACT

There is provided a method to determine a combustion parameter for an internal combustion engine. The method comprises monitoring cylinder pressure and crank angle during a combustion cycle, and determining a peak cylinder pressure, a crank angle location of the peak cylinder pressure, and a cylinder pressure at a closing of an intake valve. A combustion parameter is calculated based upon the peak cylinder pressure, the cylinder pressure at the closing of the intake valve for the combustion cycle, the crank angle location of the peak cylinder pressure, the cylinder volume at the location of the peak cylinder pressure, and the cylinder volume at the closing of the intake valve for the combustion cycle. The combustion parameter correlates to an instantaneous heat release of a cylinder charge for the combustion cycle.

19 Claims, 3 Drawing Sheets

METHOD AND APPARATUS FOR DETERMINING A COMBUSTION PARAMETER FOR AN INTERNAL COMBUSTION ENGINE

TECHNICAL FIELD

This invention relates to operation and control of engines, including homogeneous-charge compression-ignition (HCCI) engines.

BACKGROUND OF THE INVENTION

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode comprises a distributed, flameless, auto-ignition combustion process that is controlled by oxidation chemistry, rather than by fluid mechanics. In a typical engine operating in the controlled auto-ignition combustion mode, the intake charge is nearly homogeneous in composition, temperature, and residual level at intake valve closing time. Because controlled auto-ignition is a distributed kinetically-controlled combustion process, the engine operates at a very dilute fuel/air mixture (i.e., lean of a fuel/air stoichiometric point) and has a relatively low peak combustion temperature, thus forming extremely low $NO_X$ emissions. The fuel/air mixture for controlled auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the controlled auto-ignition mode can operate unthrottled to achieve diesel-like fuel economy.

At medium engine speed and load operation, a combination of valve timing strategy and exhaust rebreathing (the use of exhaust gas to heat the cylinder charge entering a combustion space in order to encourage auto-ignition) during the intake stroke has been found to be very effective in providing adequate heating to the cylinder charge so that auto-ignition during the compression stroke leads to stable combustion with low noise. This method, however, does not work satisfactorily at or near idle speed and load conditions. As the idle speed and load is approached from a medium speed and load condition, the exhaust temperature decreases. At near idle speed and load there is insufficient energy in the rebreathed exhaust to produce reliable auto-ignition. As a result, at the idle condition, the cycle-to-cycle variability of the combustion process is too high to allow stable combustion when operating in the HCCI mode. Consequently, one of the main issues in effectively operating an HCCI engine has been to control the combustion process properly so that robust and stable combustion resulting in low emissions, optimal heat release rate, and low noise can be achieved over a range of operating conditions. The benefits of HCCI combustion have been known for many years. The primary barrier to product implementation, however, has been the inability to control the HCCI combustion process.

The HCCI engine is able to transition between operating in an auto-ignited combustion mode at part-load and lower engine speed conditions and in a conventional spark-ignited combustion mode at high load and high speed conditions. These two combustion modes require different engine operation to maintain robust combustion. For instance, in the auto-ignited combustion mode, the engine operates at lean air-fuel ratios with the throttle fully open to minimize engine pumping losses. In contrast, in the spark-ignition combustion mode, the throttle is controlled to restrict intake airflow and the engine is operated in at a stoichiometric air-fuel ratio.

In the typical HCCI engine, engine air flow is controlled by adjusting an intake throttle position, or adjusting opening and closing of intake valves and exhaust valves, using a variable valve actuation (VVA) system that includes a selectable multi-step valve lift, e.g., multiple-step cam lobes which provide two or more valve lift profiles. There is a need to have a smooth transition between these two combustion modes during ongoing engine operation, in order to prevent engine misfires or partial-burns during the transitions.

The combustion process in an HCCI engine depends strongly on factors such as cylinder charge composition, temperature, and pressure at the intake valve closing. Hence, the control inputs to the engine, for example, fuel mass and injection timing and intake/exhaust valve profile, must be carefully coordinated to ensure robust auto-ignition combustion. Generally speaking, for best fuel economy, an HCCI engine operates unthrottled and with a lean air-fuel mixture. Further, in an HCCI engine using exhaust recompression valve strategy, the cylinder charge temperature is controlled by trapping different amount of the hot residual gas from the previous cycle by varying the exhaust valve close timing. Typically, the HCCI engine is equipped with one or more cylinder pressure sensors and a cylinder pressure processing unit which samples cylinder pressure from the sensor and calculates the combustion parameters such as CA50 (location of 50% fuel mass burn), IMEP, and, NMEP, among other. The objective of HCCI combustion control is to maintain desired combustion phasing, indicated by CA50, by adjusting multiple inputs such as intake and exhaust valve timings, throttle position, EGR valve opening, injection timing, etc., in real-time. Thus, the cylinder pressure processing unit generally employs expensive, high-performance DSP (Digital Signal Processing) chips to process the vast amount of cylinder pressure samples to generate combustion parameters in real-time.

In the present invention, there is provided a method and a control scheme for determining a combustion parameter based upon an instantaneous heat release in an internal combustion engine which reduces a need for DSP chips and other intensive data processing costs.

SUMMARY OF THE INVENTION

In accordance with an embodiment of the invention, there is provided a method to determine a combustion parameter for an internal combustion engine. The method comprises monitoring cylinder pressure and crank angle during a combustion cycle, and determining a peak cylinder pressure and a crank angle location of the peak cylinder pressure. A cylinder volume is determined at the crank angle location of the peak cylinder pressure, and at a closing of an intake valve for the combustion cycle. A combustion parameter is calculated based upon the peak cylinder pressure, the cylinder pressure at the closing of the intake valve for the combustion cycle, the crank angle location of the peak cylinder pressure, the cylinder volume at the location of the peak cylinder pressure, and the cylinder volume at the closing of the intake valve for the combustion cycle. The calculated combustion parameter correlates to an instantaneous heat release of a cylinder charge for the combustion cycle.

These and other aspects of the invention are described hereinafter with reference to the drawings and the description of the embodiments.

DESCRIPTION OF THE DRAWINGS

The invention may take physical form in certain parts and arrangement of parts, the embodiments of which are described in detail and illustrated in the accompanying drawings which form a part thereof, and wherein.

DESCRIPTION OF EXEMPLARY EMBODIMENTS

Figure 1:
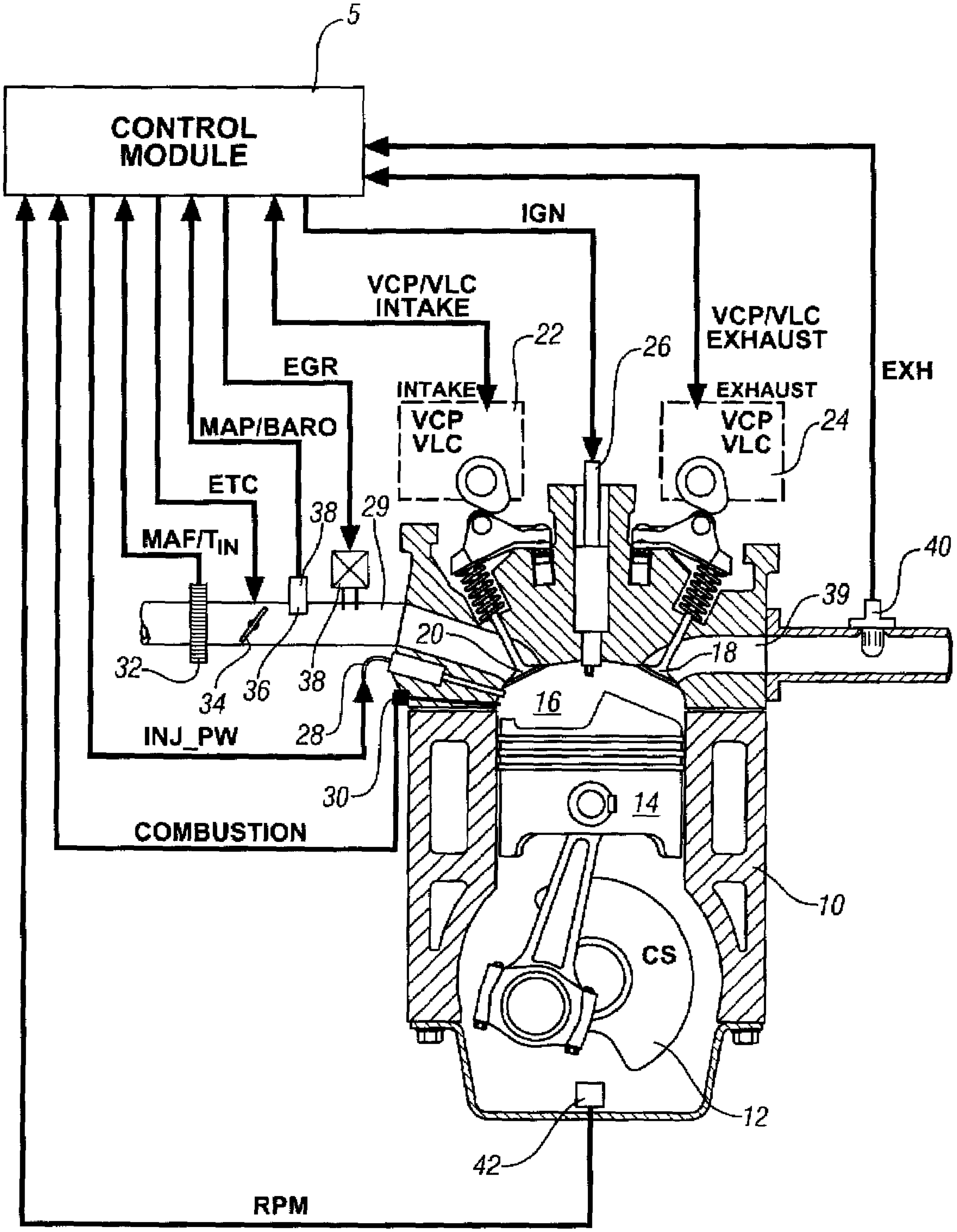
FIG. 1 is a schematic drawing of an engine system, in accordance with the present invention; and, FIGS. 2 and 3 are datagraphs, in accordance with the present invention.

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention. The engine is selectively operative in a controlled auto-ignition mode and a conventional spark-ignition mode.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake runner 29 to each combustion chamber 16. The air intake system comprises airflow ductwork and devices for monitoring and controlling the air flow. The devices preferably include a mass airflow sensor 32 for monitoring mass airflow ('MAF') and intake air temperature ('$T_{IN}$'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling valve lift of the intake valves and the exhaust valves, referred to as variable lift control ('VLC'). The variable valve lift system comprises devices operative to control valve lift, or opening, to one of two distinct steps, e.g., a low-lift valve opening (about 4-6 mm) for load speed, low load operation, and a high-lift valve opening (about 8-10 mm) for high speed and high load operation. The engine is further equipped with devices for controlling phasing (i.e., relative timing) of opening and closing of the intake valves and the exhaust valves, referred to as variable cam phasing ('VCP'), to control phasing beyond that which is effected by the two-step VLC lift. There is a VCP/VLC system 22 for the engine intake and a VCP/VLC system 24 for the engine exhaust. The VCP/VLC systems 22, 24 are controlled by the control module, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used. As known to skilled practitioners, VCP/VLC systems have a limited range of authority over which opening and closings of the intake and exhaust valves can be controlled. Variable cam phasing systems are operable to shift valve opening time relative to crankshaft and piston position, referred to as phasing. The typical VCP system has a range of phasing authority of 30°-50° of cam shaft rotation, thus permitting the control system to advance or retard opening and closing of the engine valves. The range of phasing authority is defined and limited by the hardware of the VCP and the control system which actuates the VCP. The VCP/VLC system is actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to a signal ('INJ_PW') from the control module. The fuel injectors 28 are supplied pressurized fuel from a fuel distribution system (not shown).

The engine includes a spark ignition system by which spark energy is provided to a spark plug 26 for igniting or assisting in igniting cylinder charges in each of the combustion chambers, in response to a signal ('IGN') from the control module. The spark plug 26 enhances the ignition timing control of the engine at certain conditions (e.g., during cold start and near a low load operation limit).

The engine is equipped with various sensing devices for monitoring engine operation, including a crankshaft rotational speed sensor 42 having output RPM, and camshaft rotational speed sensors for intake and exhaust camshafts. There is a combustion sensor 30 adapted to monitor in-cylinder pressure 30 and having output COMBUSTION, and, a sensor 40 adapted to monitor exhaust gases having output EXH, typically a wide range air/fuel ratio sensor. The combustion sensor 30 comprises a pressure sensing device adapted to monitor in-cylinder combustion pressure.

The engine is designed to operate un-throttled on gasoline or similar fuel blends with auto-ignition combustion ('HCCI combustion') over an extended range of engine speeds and loads. The engine operates in spark ignition combustion mode with controlled throttle operation with conventional or modified control methods under conditions not conducive to the HCCI combustion mode operation and to obtain maximum engine power to meet an operator torque request. Fueling preferably comprises direct fuel injection into the each of the combustion chambers. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present invention.

The control module is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms in the form of machine-readable code, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, spark timing, fuel injection mass and timing, intake and/or exhaust valve lift, timing and phasing, and EGR valve position to control flow of recirculated exhaust gases. Valve lift, timing and phasing includes the two-step valve lift, and, negative valve overlap (NVO). The control module 5 is adapted to receive input signals from an operator (e.g., a throttle pedal position and a brake pedal position) to determine an operator torque request ($T_{O\_REQ}$) and from the sensors indicating the engine speed (RPM) and intake air temperature ($T_{IN}$), and coolant temperature and other ambient conditions. The control module 5 operates to determine, from lookup tables in memory, instantaneous control settings for spark timing (as needed), EGR valve position, intake and exhaust valve timing and two-step lift transition set points, and fuel injection timing, and calculates the burned gas fractions in the intake and exhaust systems.

Figure 2:
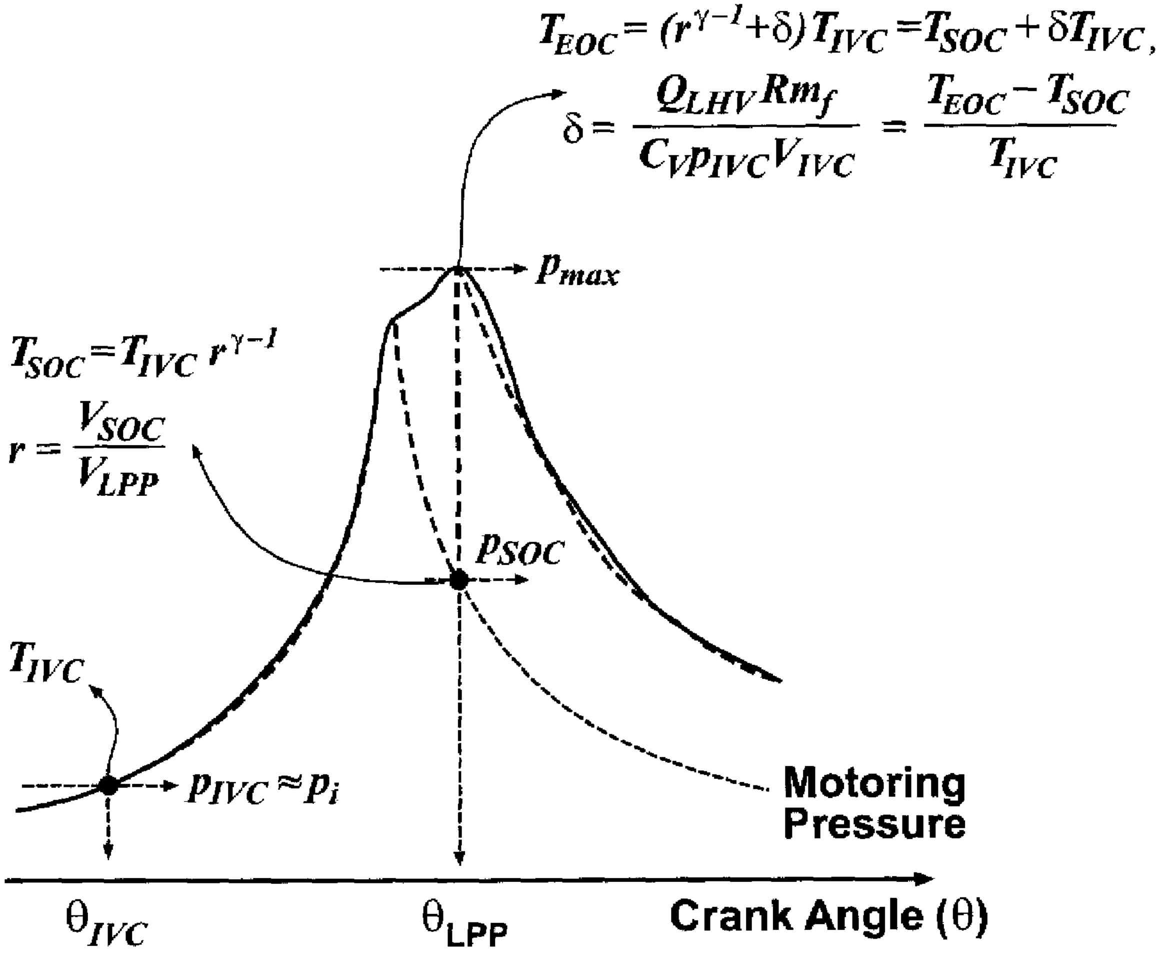

Referring now to FIG. 2, an approximation of in-cylinder temperature for an exemplary internal combustion engine is depicted as a function of crank angle, θ, based upon a constant-volume ideal combustion cycle model. Relevant temperatures and other parameters include:

$T_{IVC}$: temperature at intake valve closing;

$T_{SOC}$: temperature at start of combustion;

$T_{EOC}$: temperature at end of combustion;

$p_{IVC}$: pressure at intake valve closing;

$p_i$: intake manifold pressure; measurable with the MAP sensor;

$p_{SOC}$: pressure at start of combustion;

$p_{max}$: peak cylinder pressure, measurable with the combustion pressure sensor;

$V_{IVC}$: cylinder volume at intake valve closing, determined using known slider equations and inputs from the crankshaft and camshaft position sensors, and, $V_{LPP}$: cylinder volume at location of peak pressure, determined using known slider equations and inputs from the crankshaft and camshaft position sensors;

$\theta_{IVC}$: crank angle at intake valve closing, and, $\theta_{LPP}$: crank angle at location of peak pressure, measurable using the crankshaft position sensor, in conjunction with the cylinder pressure sensor;

$Q_{LHV}$: low heating value of fuel;

$m_f$: fuel mass;

R: the gas constant;

γ: specific heat ratio; and, $C_v$: specific heat at constant volume.

Specific parameters are calculated or estimated, as follows:

$$T_{SOC}=T_{IVC}*r^{\gamma-1};$$

$$r=V_{IVC}/V_{LPP};$$

$$T_{EOC}=(r^{\gamma-1}+\delta)*T_{IVC}=T_{SOC}+\delta T_{IVC};$$

$$\delta=(Q_{LHV}*R*m_f)/C_v*p_{IVC}*V_{IVC},\ \text{i.e.,:}$$

$$\delta=(T_{EOC}-T_{SOC})/T_{IVC}.$$

The temperatures comprise approximated cylinder charge temperatures over an engine cycle calculated from a known constant-volume ideal combustion cycle model. The mode assumes instantaneous combustion, and is suitable to describe auto-ignited combustion, which normally has much faster fuel burning rate than conventional spark-ignited combustion. The combustion parameter δ comprises instantaneous heat release due to the combustion, normalized by the temperature at intake valve closing, $T_{IVC}$.

The combustion parameter δ is determined by executing code, comprising one or more algorithms, in the control module, preferably during each engine cycle. The combustion parameter is relatively simple to calculate, thus, does not require expensive signal processing and data analysis hardware for monitoring cylinder pressure. Peak cylinder pressure and the corresponding crankshaft rotational location of the peak cylinder pressure are measured using the combustion pressure sensor 30 and the crankshaft sensor 42. The intake valve closing is determined, as described above, using the feedback from the intake cam position sensor.

Once the intake valve closes, the mass of air trapped in the cylinder remains the same until the exhaust valve opens. Thus, one can derive a relation using the ideal gas law, as follows in Eq. 1:

$$\frac{p_{SOC}}{T_{SOC}} = \frac{p_i r^{\gamma}}{T_{IVC} r^{\gamma-1}} = \frac{p_{max}}{T_{EOC}} = \frac{p_{max}}{T_{IVC}(r^{\gamma-1}+\delta)}. \quad [1]$$

A combustion parameter δ comprising normalized instantaneous heat release is calculated using Eq. 2, as follows:

$$\delta = \frac{p_{max}}{rp_i} - r^{\gamma-1} = \frac{V_{LPP}\,p_{max}}{V_{IVC}\,p_i} - \left(\frac{V_{IVC}}{V_{LPP}}\right)^{\gamma-1}. \quad [2]$$

Here, the specific heat ratio $\gamma$ is assumed to be constant over an entire engine cycle. As demonstrated in Eq. 2, the combustion parameter $\delta$ is readily calculated by executing an algorithm in real-time once the peak cylinder pressure, $p_{max}$, the cylinder pressure at intake valve closing, $p_{IVC}$, and the locations of the peak cylinder pressure and associated cylinder volume $V_{LPP}$ and intake valve closing and associated cylinder volume, $V_{IVC}$ are detected or determined.

Figure 3:
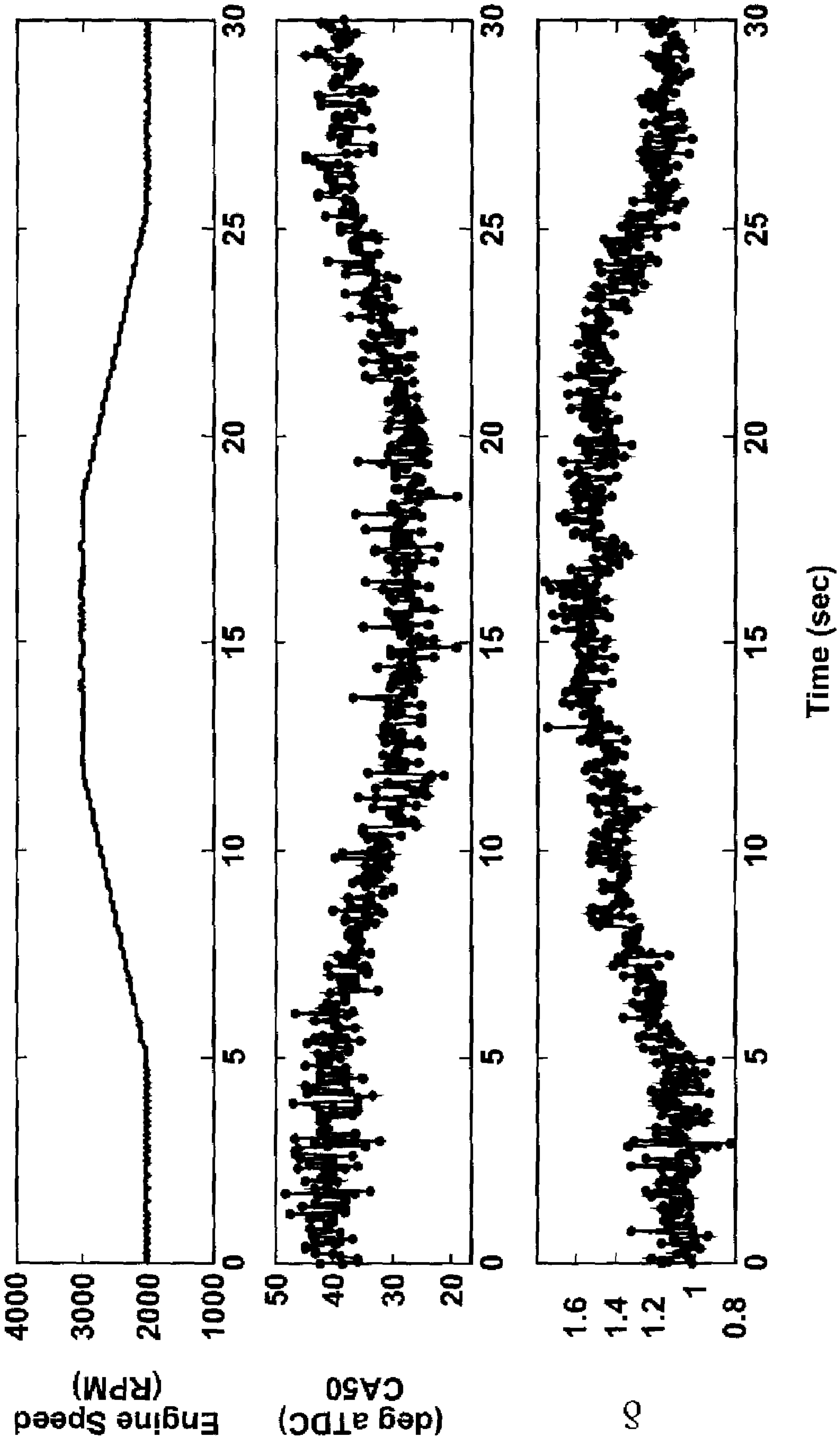

Referring now to FIG. 3, there is provided experimental and derived data from an exemplary engine, depicting CA50 (i.e., crank angle location of 50% fuel mass burn), and combustion parameter $\delta$, calculated from the experimental data. The exemplary engine was operated with fixed fueling rate of 7 mg/cycle with engine speed changing between 2000 rpm and 3000 rpm. The results indicate that the state of the CA50 parameter advances as engine speed increases. It is surmised that the advance in combustion phasing indicated by the state of the CA50 parameter results from the fueling rate per time increasing with increasing engine speed, thus increasing cylinder wall temperature and as a result, fuel burning rate. The response of the combustion phasing is reflected in the combustion parameter $\delta$; to wit, as the combustion phasing advances, the combustion parameter $\delta$ increases since instantaneous heat release increases due to fast burning fuel. This indicates that the normalized instantaneous heat release, i.e., the combustion parameter $\delta$, has a strong correlation with combustion phasing, and thus useable for controlling combustion phasing of an engine operating in the auto-ignition mode, e.g., HCCI combustion control.

In the present invention, a system architecture that makes the real-time calculation of parameter ($\delta$) possible without overloading a central processing unit (CPU) of the control module is described. Two embodiments of system architectures are depicted with reference to FIG. 2. Signals output from the cylinder pressure sensor (COMBUSTION) and the crankshaft sensor CS_RPM comprise the inputs. There is an Analog Peak Detector Circuit, comprising an analog circuit that captures a maximum value of the analog signal ($p_{max}$) input from cylinder pressure sensor. The advantage of using an analog circuit to detect peak pressure value is the fact that the CPU and its analog/digital converter (ADC) are not burdened in collecting and storing cylinder pressure signals at high crank angle resolution. However, in order to calculate the parameter ($\delta$), a location of peak pressure is needed. An All-pass Filter and Analog Comparator Circuit (depicted as a dual input comparator) are used to inform the CPU and peripherals responsible for engine position determination (CS_RPM) about crankshaft position location of the peak pressure. The function of the All-Pass Filter is to delay the peak cylinder pressure measurement without distorting it. The Analog Comparator Circuit continuously monitors the pressure signal to determine when it is less than the maximum value of the pressure signal that is delayed through the all-pass filter. When the delayed maximum cylinder pressure signal is greater than the cylinder pressure signal, the maximum of the pressure signal is detected and the comparator toggles its digital output. The toggled signal at the output of comparator triggers the peripheral in the CPU that is responsible for engine position determination. Upon receiving the trigger signal, the peripheral captures the engine position and stores it as the value of location of peak pressure (LPP). When the related task in the CPU software calculates the normalized instantaneous heat release, it reads LPP parameter and commands the ADC peripheral to convert the analog signal at the output of analog peak detector circuit into a digital signal. Since $V_{IVC}$ and $P_{IVC}$ can also be easily calculated and measured respectively, once the peak pressure conversion is complete, the software executes Eq. 1 in algorithmic form. In order to detect the LPP and $p_{max}$ of the next cycle, the software resets the analog peak detector circuit. Moreover, software can compensate the error introduced to the LPP as the result of known delays in the comparator and/or digital filter using the crankshaft (CS_RPM) measurement.

While the invention has been described by reference to certain embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. Method to determine a combustion parameter for an internal combustion engine, comprising:

monitoring cylinder pressure and crank angle during a combustion cycle;

determining a peak cylinder pressure and a crank angle location of the peak cylinder pressure;

determining a cylinder volume at the crank angle location of the peak cylinder pressure;

determining a cylinder pressure at a closing of an intake valve for the combustion cycle;

determining a cylinder volume at the closing of the intake valve for the combustion cycle; and, calculating a combustion parameter based upon the peak cylinder pressure, the cylinder pressure at the closing of the intake valve for the combustion cycle, the crank angle location of the peak cylinder pressure, the cylinder volume at the location of the peak cylinder pressure, and the cylinder volume at the closing of the intake valve for the combustion cycle.

2. The method of claim 1, wherein the calculated combustion parameter correlates to an instantaneous heat release of a cylinder charge for the combustion cycle.

3. The method of claim 1, further comprising calculating the combustion parameter based upon a specific heat ratio for a cylinder charge for the combustion cycle.

4. The method of claim 1, further comprising an article of manufacture comprising a storage medium having a computer program encoded therein operative to determine the combustion parameter.

5. The method of claim 1, further comprising calculating the combustion parameter based upon the peak cylinder pressure, the cylinder pressure at the closing of the intake valve for the combustion cycle, the crank angle location of the peak cylinder pressure, the cylinder volume at the location of the peak cylinder pressure, and, the cylinder volume at the closing of the intake valve for the combustion cycle.

6. The method of claim 5, further comprising calculating the combustion parameter each combustion cycle during ongoing engine operation.

7. Method to monitor combustion phasing during operation of an internal combustion engine, comprising:

monitoring cylinder pressure and crank angle during a combustion cycle;

determining a peak cylinder pressure and a crank angle location of the peak cylinder pressure;

determining a cylinder volume at the crank angle location of the peak cylinder pressure;

determining a cylinder pressure at a closing of an intake valve for the combustion cycle;

determining a cylinder volume at the closing of the intake valve for the combustion cycle; and, calculating a combustion parameter correlatable to the crank angle based upon the peak cylinder pressure, the cylinder pressure at the closing of the intake valve for the combustion cycle, the crank angle location of the peak cylinder pressure, the cylinder volume at the location of the peak cylinder pressure, and the cylinder volume at the closing of the intake valve for the combustion cycle.

8. The method of claim 7, wherein the calculated combustion parameter correlates to an instantaneous heat release of a cylinder charge for the combustion cycle.

9. The method of claim 8, further comprising calculating the combustion parameter based upon a specific heat ratio for a cylinder charge for the combustion cycle.

10. The method of claim 7, further comprising calculating the combustion parameter based upon the peak cylinder pressure, the cylinder pressure at the closing of the intake valve for the combustion cycle, the crank angle location of the peak cylinder pressure, the cylinder volume at the location of the peak cylinder pressure, the cylinder volume at the closing of the intake valve for the combustion cycle.

11. The method of claim 10, wherein the combustion parameter is calculated once per engine cycle.

12. The method of claim 11, further comprising an article of manufacture comprising a storage medium having a computer program encoded therein operative to calculate the combustion parameter once per engine cycle.

13. Method to monitor combustion phasing during operation of an internal combustion engine operating in an auto-ignition combustion mode, comprising:

operating the internal combustion engine in the auto-ignition combustion mode;

monitoring cylinder pressure and crank angle during each combustion cycle;

determining a peak cylinder pressure and a crank angle location of the peak cylinder pressure;

determining a cylinder volume at the crank angle location of the peak cylinder pressure;

determining a cylinder pressure at a closing of the intake valve for the combustion cycle;

determining a cylinder volume at the closing of the intake valve for the combustion cycle; and, calculating a combustion parameter based upon the peak cylinder pressure, the cylinder pressure at the closing of the intake valve for the combustion cycle, the crank angle location of the peak cylinder pressure, the cylinder volume at the location of the peak cylinder pressure, and the cylinder volume at the closing of the intake valve for the combustion cycle.

14. The method of claim 13, further comprising calculating the combustion parameter based upon the peak cylinder pressure, the cylinder pressure at the closing of the intake valve for the combustion cycle, the crank angle location of the peak cylinder pressure, the cylinder volume at the location of the peak cylinder pressure, the cylinder volume at the closing of the intake valve for the combustion cycle.

15. The method of claim 13, wherein the combustion parameter is calculated once per engine cycle.

16. The method of claim 13, further comprising an article of manufacture comprising a storage medium having a computer program encoded therein operative to calculate the combustion parameter once per engine cycle.

17. The method of claim 13, comprising a control module adapted to execute machine-readable code store therein to operate the internal combustion engine in the auto-ignition combustion mode, and, adapted to monitor the combustion phasing of the internal combustion engine during operation in the auto-ignition combustion mode.

18. The method of claim 13, further comprising calculating the combustion parameter based upon a specific heat ratio for a cylinder charge, the calculated combustion parameter correlatable to an instantaneous heat release of a cylinder charge for the combustion cycle.

19. The method of claim 18, wherein the calculated combustion parameter is correlatable to the crank angle.

* * * * *